United States Patent
Gustafson et al.

[11] Patent Number: 5,914,855
[45] Date of Patent: Jun. 22, 1999

[54] APPARATUS AND METHOD FOR DAMPING DISK DRIVE VIBRATION

[75] Inventors: Gary Gustafson, Westminster; Barry Lovvorn, Lafayette; Chris Vinton, Louisville, all of Colo.

[73] Assignee: International Business Machines Corporation, Armonk, N.Y.

[21] Appl. No.: 08/999,162

[22] Filed: Dec. 30, 1997

[51] Int. Cl.$^6$ ........................................ G06F 1/16
[52] U.S. Cl. ........................ 361/685; 248/638; 439/382; 439/377
[58] Field of Search ................... 361/685, 732, 361/740, 741, 742, 752, 756, 758, 804; 248/638, 634, 560, 562; 439/382, 383, 260, 377

[56] References Cited

U.S. PATENT DOCUMENTS

| | | |
|---|---|---|
| 3,654,521 | 4/1972 | LaSelle . |
| 3,845,359 | 10/1974 | Fedele . |
| 4,007,403 | 2/1977 | Fiege . |
| 4,607,751 | 8/1986 | Straccia, Jr. et al. ............... 211/41 |
| 4,979,909 | 12/1990 | Andrews . |
| 5,123,721 | 6/1992 | Seo . |
| 5,142,447 | 8/1992 | Cooke et al. . |
| 5,262,923 | 11/1993 | Batta et al. . |
| 5,340,340 | 8/1994 | Hastings et al. . |
| 5,426,568 | 6/1995 | Lamers et al. ............... 361/810 |
| 5,463,527 | 10/1995 | Hager et al. ............... 361/685 |
| 5,467,254 | 11/1995 | Brusati et al. . |
| 5,510,955 | 4/1996 | Taesang . |
| 5,533,631 | 7/1996 | Marchetti . |
| 5,537,294 | 7/1996 | Siwinski ............... 361/753 |
| 5,552,946 | 9/1996 | Bicknese et al. . |
| 5,563,450 | 10/1996 | Bader et al. . |
| 5,572,400 | 11/1996 | Roesner et al. . |
| 5,579,204 | 11/1996 | Nelson et al. ............... 361/685 |

FOREIGN PATENT DOCUMENTS

| | | |
|---|---|---|
| 3527-677 | 2/1987 | Germany . |
| 712-989 | 1/1980 | U.S.S.R. . |

OTHER PUBLICATIONS

IBM™ Technical Disclosure Bulletin: "Spring–Loaded File Rails", vol. 28, No. 12, May 1986 (3 pages).
IBM™ Technical Disclosure Bulletin: "Grounded File-Mounting Plate", vol. 29, No. 12, May 1987 (2 pages).
IBM™ Technical Disclodure Bulletin: "Vibration Isolation Using Secondary Mounting Plate", vol. 33, No. 5, Oct. 1990(1 page).

*Primary Examiner*—Leo P. Picard
*Assistant Examiner*—Jagdish Patel
*Attorney, Agent, or Firm*—Merchant, Gould, Smith, Edell, Welter & Schmidt, P.A.

[57] ABSTRACT

The present disclosure relates to a disk drive assembly including a printed circuit board having a front end opposite a back end, and opposite side edge portions extending between the front and back ends. A disk drive is electrically and mechanically connected to printed circuit board. Clips for damping vibration are mounted on each opposite side edge portion of the printed circuit board. Damping is also achieved via elastomeric layers positioned between the clips and the printed circuit board.

22 Claims, 3 Drawing Sheets

APPARATUS AND METHOD FOR DAMPING DISK DRIVE VIBRATION

FIELD OF THE INVENTION

The present invention relates generally to disk drive systems and mounting configurations. More particularly, the present invention relates to disk drive mounting configurations and methods for damping disk drive vibration.

BACKGROUND OF THE INVENTION

Direct access storage devices, or disk drives, store information on concentric tracks of a rotatable magnetic recording disk. A slider having a transducer or magnetic head is moved from track to track to record and read the desired information. The slider typically includes air-bearing surfaces configured for causing the magnetic head to fly a desired distance above the surface of the disk as the disk rotates.

Disk drives are often mounted in a rectangular sheet metal "cage" structure located within a computer chassis. The cage typically includes means for receiving multiple disk drives. Each disk drive typically interfaces with other components of the computer via a "hot plug" connection. This type of electrical connection allows any of the disk drives mounted within the cage to be easily individually moved and reinstalled within the cage.

Conventionally, each disk drive positioned within the cage is mounted on a printed circuit board having a rear card edge portion that is insertable into a back plane hot plug socket located at the back of the cage. To install one of the disk drives within the cage, side edge portions of its corresponding printed circuit board are inserted into a pair of slots or tracks formed on opposite side walls of the cage. The printed circuit board is then slid along the slots or tracks until the rear card edge portion of the circuit board is operatively received in its associated hot plug socket at the back of the cage.

SUMMARY OF THE INVENTION

Vibration is a significant problem that affects the operating efficiency of disk drives. Specifically, if a disk drive is not mounted solidly, the vibration it creates from its own seeking activity may cause its magnetic head to take an excessive amount of time to settle, thereby lengthening seek times and also producing "write inhibit" errors. The design of conventional mechanical packaging support structure, such as conventional cages, often conducts vibration between disk drives, and in some cases amplifies vibration due to harmonic resonance. Consequently, problems associated with vibration are often intensified in systems having multiple disk drives.

The present invention addresses the above-identified problems as well as other problems. Specifically, the various aspects of the present invention provide methods and mounting configurations for reducing or damping disk drive vibration. Significantly, the various aspects of the present invention provide disk drive damping methods and configurations that can be used with existing disk drive and card cage assemblies without requiring such assemblies to be significantly modified. Consequently, the various aspects of the present invention provide techniques for efficiently and inexpensively damping vibration in existing disk drive systems without requiring such systems to be significantly redesigned or retrofitted.

One aspect of the present invention relates to a disk drive mounting configuration including a cage having opposing walls that define opposing card slots. The configuration also includes a card on which a disk drive is mounted. The card includes opposite side edge portions that are secured within the opposing card slots of the cage. Clips are mounted on the side edge portions of the card and are compressed within the card slots of the cage. The mounting configuration further includes elastomeric layers positioned between the clips and the card. The elastomeric layers cooperate with the clips to damp vibration transferred between the card and the cage.

Another aspect of the present invention relates to a disk drive assembly including a printed circuit board including opposite side edge portions adapted to be inserted within card receiving slots of a cage. A disk drive is electrically and mechanically connected to the printed circuit board. The system also includes clips mounted on the opposite side edge portions of the printed circuit board, and elastomeric layers positioned between the clips and the printed circuit board.

A further aspect of the present invention relates to a method for damping vibration in a disk drive system. The disk drive system includes a card cage defining opposing card slots, and a disk drive mounted on a card adapted to be inserted in the card slots of the cage. The method includes the step of placing layers of elastomeric non-hardening adhesive on the card adjacent opposite side edge portions of the card. The method also includes the step of securing clips to the opposite side edge portions of the card via the non-hardening adhesive such that the non-hardening adhesive is positioned between the clips and the card. Finally, the method includes the step of inserting the opposite side edge portions of the card within the card slots of the cage such that the clips and non-hardening adhesive are compressed and deformed within the slots. The clips and non-hardening adhesive cooperate to damp vibration transferred between the card and the cage.

A variety of additional advantages of the invention will be set forth in part in the description which follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE PREFERRED EMBODIMENTS

Reference will now be made in detail to exemplary aspects of the present invention which are illustrated in the accompanying drawings. Wherever possible, the same reference numbers will be used throughout the drawings to refer to the same or like parts.

Figure 1:
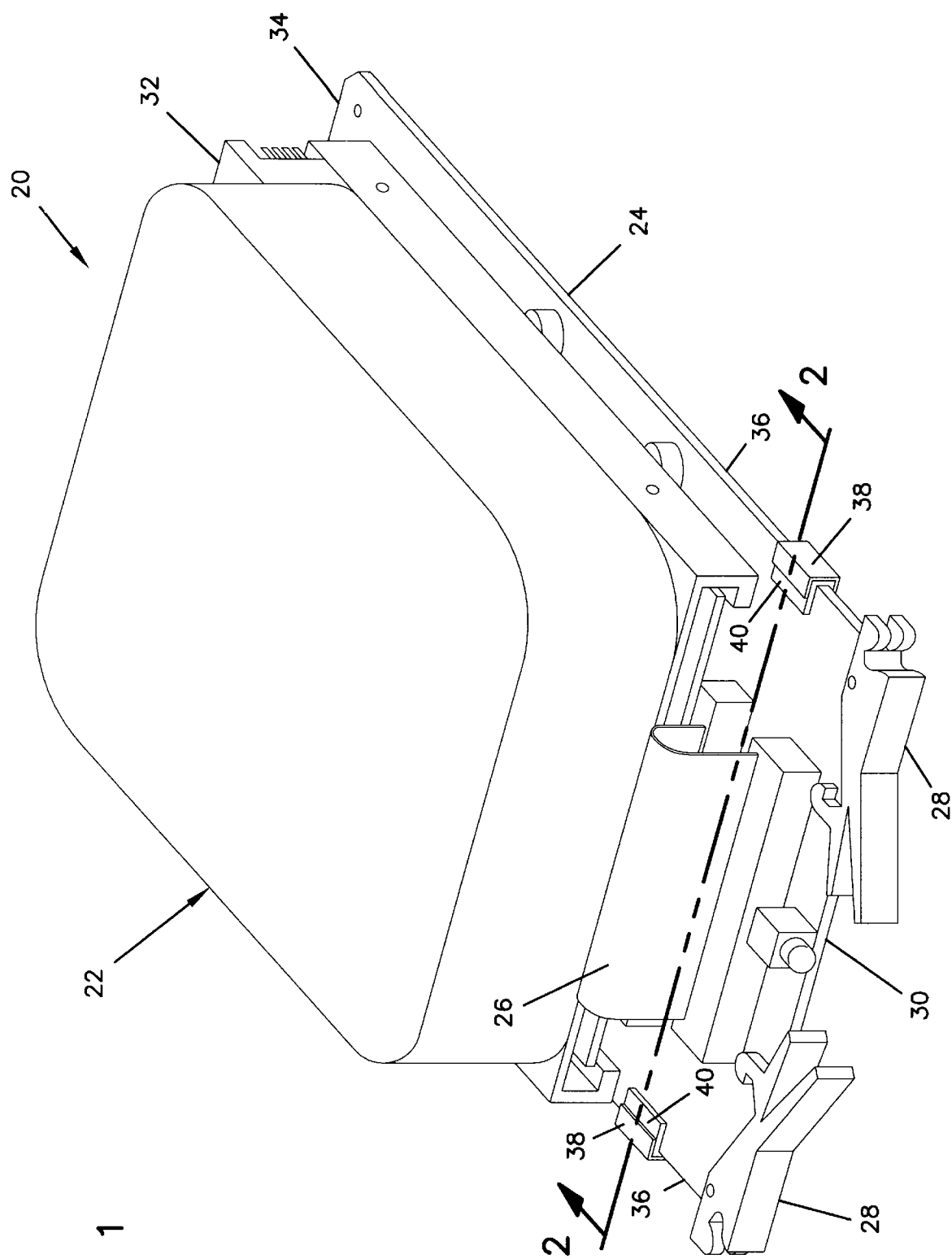
FIG. 1 illustrates a disk drive assembly constructed in accordance with the principles of the present invention.

FIG. 1 illustrates a disk drive assembly 20 constructed in accordance with the principles of the present invention.

Generally, the disk drive assembly 20 includes a disk drive 22 secured to a card or printed circuit board 24 by conventional techniques. A ribbon connector 26 provides an electrical interface between the disk drive 22 and the printed circuit board 24. Pivotal latches 28 are secured adjacent to a front end 30 of the printed circuit board 24. The latches 28 are used to insert and lock the printed circuit board 24 within a card cage, and also function to eject the printed circuit board 24 from a card cage. The disk drive assembly 20 also includes an input/output connector 32 located at a back end 34 of the printed circuit board 24. The input/output connector 32 is adapted to interface with a plug socket located at a back plane of a cage structure.

The card or printed circuit board 24 includes opposite side edge portions 36 extending between the front and back ends 30 and 34 of the printed circuit board 24. The side edge portions 36 are arranged and configured to be received within opposing slots of a card cage. To damp vibration between the printed circuit board 24 and a card cage, clips 38 are mounted on each opposite side edge portion 36 of the printed circuit board 24. Additionally, elastomeric layers 40 are positioned between the clips 38 and the printed circuit board 24 to further damp vibration transferred between the printed circuit board 24 and a card cage.

Figure 2:
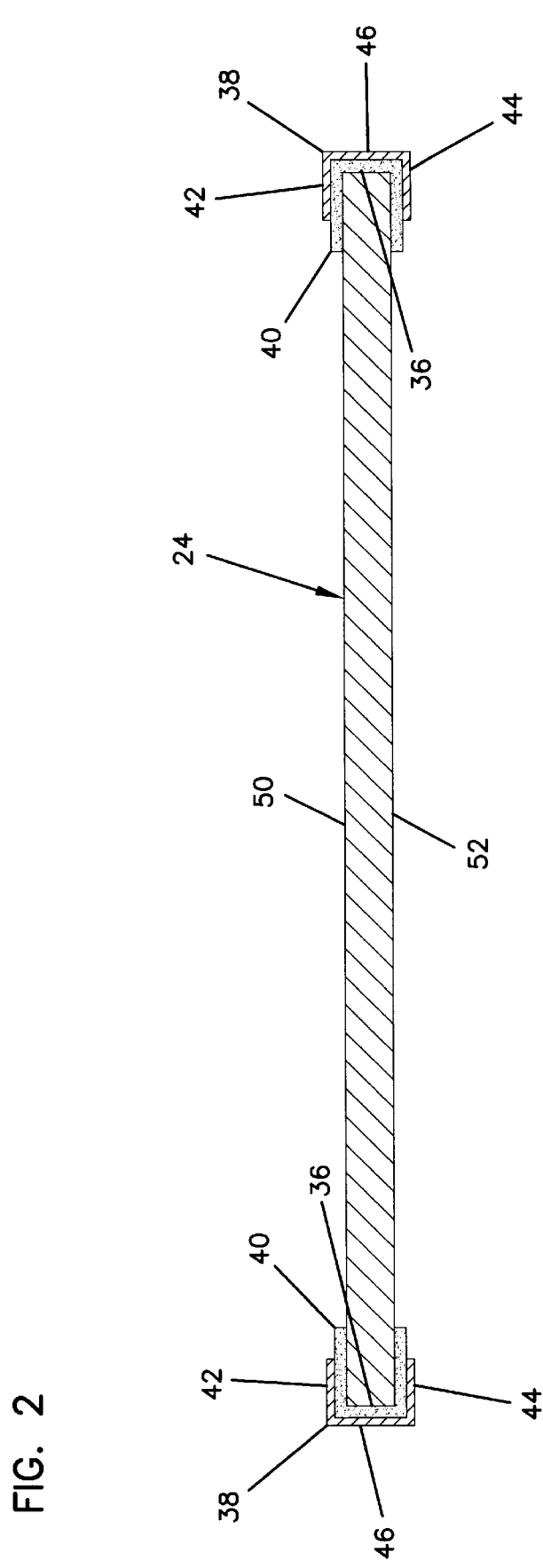
FIG. 2 is a cross-sectional view taken along section line 2—2 of FIG. 1.

FIG. 2 is a cross-sectional view taken along section line 2—2 of FIG. 1. As shown in FIG. 2, each of the clips 38 has a generally U-shaped cross-section and is arranged and configured to straddle its respective side edge portion 36 of the printed circuit board 24. More particularly, each clip 38 includes first and second opposing spaced apart legs 42 and 44 that are substantially parallel to one another. The first and second legs 42 and 44 of each clip 38 are held in spaced apart relation by a bridge portion 46 that extends transversely between the legs 42 and 44. The bridge portion 46 is aligned generally transversely with respect to both the first and second legs 42 and 44. The first and second legs 42 and 44 and the bridge portion 46 of each clip 38 cooperate to define a generally rectangular channel sized for receiving one of the side edge portions 36 of the printed circuit board 24.

The clips 38 are preferably made of an elastic material such as beryllium copper. By manufacturing the clips 38 from elastic materials, the clips 38 have elastic of spring-like characteristics. For example, when the first and second legs 42 and 44 of a particular clip 38 are pressed toward one another, internal tension or stress within the clip 38 resists the inward pressure and biases the legs 42 and 44 outward. Consequently, when the pressure is released from the legs 42 and 44, the legs 42 and 44 spring back to their original position.

The elastomeric layers 40 positioned between the clips 38 and the printed circuit board 24 are preferably made from an elastomeric non-hardening adhesive such as acrylic adhesive or rubber cement. The term elastomeric non-hardening adhesive is intended to mean that the adhesive remains permanently resilient or deformable and does not become brittle upon curing. The elastomeric layers 40 formed of elastomeric adhesive function to form cushioning or damping layers between the clips 38, and also function to mechanically bond or secure the clips 38 to the printed circuit board 24.

Referring back to FIG. 2, the clips 38 are mounted on the printed circuit board 24 by first wrapping the elastomeric layers 40 around the edges of the printed circuit board 24 such that portions of the elastomeric layers 40 are affixed to the side edge portions 36 of the printed circuit board 24 as well as to top and bottom surfaces 50 and 52 of the printed circuit board 24. Next, the clips 38 are inserted over the elastomeric layers 40 such that the side edge portions 36 are received in the channels of the clips 38 and the elastomeric layers are positioned between the clips 38 and the printed circuit board 24. In such a configuration, the bridge portions 46 of the clips 38 oppose the side edge portions 36 of the printed circuit board 24, the first legs 42 of the clips 38 oppose the top surface 50 of the printed circuit board 24, and the second legs 44 of the clips 38 oppose the bottom surface 52 of the printed circuit board 24. The elastomeric layers 40 are positioned between the top surface 50 of the printed circuit board 24 and the first legs 42 of the clips 38, between the bottom surface 52 of the printed circuit board 24 and the second legs 44 of the clips 38, and also between the side edge portions 36 of the printed circuit board 24 and the bridge portions 36 of the clips 38.

Figure 3:
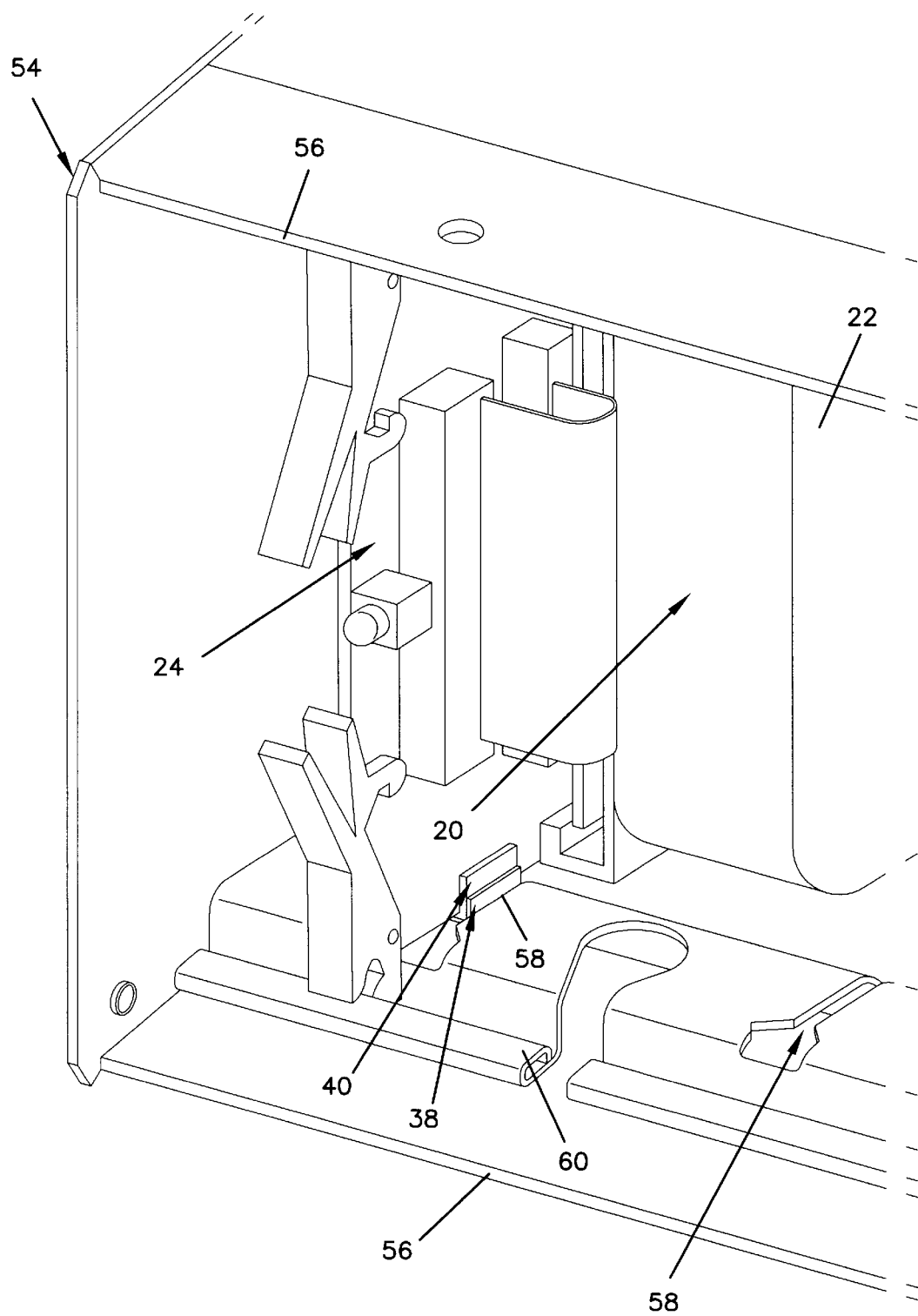
FIG. 3 illustrates the disk drive assembly of FIG. 1 mounted within a card cage of a computer chassis.

FIG. 3 illustrates the disk drive assembly 20 of FIG. 1 mounted within a cage structure 54 that would typically be secured within a computer chassis. The cage structure 54 includes opposing walls 56 defining a plurality of opposing card slots 58 arranged and configured for receiving the side edge portions 36 of the printed circuit board 24. Although card slots 58 are only visible on the lowermost wall of the opposing walls 56 depicted in FIG. 3, one skilled in the art will recognize that the uppermost opposing wall 56 defines identical card slots that are aligned with the card slots 58 of the lowermost opposing wall 56.

To mount the disk drive assembly 20 in the cage structure 54, the back end 34 of the printed circuit board 24 is inserted in the cage structure 54 such that the side edge portions 36 are received in the opposing card slots 58. The printed circuit board 24 is then slid along the card slots 58 toward a back plane (not shown) of the cage structure 54. The pivotal latches 28 on the printed circuit board 24 are then hooked into outer grooves 60 of the cage structure 54 and are used to push the printed circuit board 24 into the cage structure 54 with sufficient force that an electrical connection is made between the input/output connector 32 of the disk drive assembly 20 and a back plane hot plug socket located at the back of the cage structure 54.

As the printed circuit board 24 is inserted within the card slots 58, the clips 38 located at the side edge portions 36 of the printed circuit board 24 are compressed, deformed or otherwise wedged within the card slots 58 to provide a tight solid connection between the printed circuit board 24 and the card cage 54. Specifically, as the side edge portions 36 of the printed circuit board 24 are inserted in the card slots 58, the bridge portion 46 of each clip 38 is deformed and the first and second legs 42 and 44 of each clip 38 are pressed toward one another. Additionally, the elastomeric layers 40 are compressed between the clips 38 and the printed circuit board 24. Consequently, the clips 38 are securely biased against the surfaces defining the card slots 58 by both internal spring tension generated within the clips 38 themselves, and by spring pressure generated by the compressed elastomeric layers 40.

To remove the disk drive assembly 20 from the cage structure 54, it is only necessary to pull the printed circuit board 24 outward from the cage structure 54 along the card slots 58. The ejection process is typically initiated via the pivotal latches 28.

As shown in FIGS. 1 and 3, the disk drive assembly 20 is equipped with one clip 38 located at each side portion 36 of the printed circuit board 24. The clips 38 are generally positioned adjacent to the front end 30 of the printed circuit board 24. This arrangement is preferred because the back end 34 of the printed circuit board 24 is typically stabilized via the electrical connection provided between the input/output connector 32 and the back plane of the cage structure 54. However, those skilled in the art will appreciate that the clips 38 could be positioned at any location along the length of the side edge portions 36 and that multiple clips could be used on each side portion 36. Moreover, further vibration damping can be achieved by adding constraint layered damping to both opposing walls 56 of the card cage 54 in the region where the disk drive assembly 20 is mounted.

It will be appreciated that the thicknesses of the clips 38 and the elastomeric layers 40 are dependent upon the particular tolerances that exist between a given printed circuit board and the card slots of a given cage structure. However, in one particular embodiment, the clips have thicknesses of about 0.01 inch, and the elastomeric layers have thicknesses of about 0.02 inches. Clearly, the above identified thicknesses are strictly illustrative and should not be construed as a limitation upon the present invention.

The various aspects of the present invention described above provide methods and mounting configurations for damping disk drive vibration without requiring significant modification or reworking of a particular disk drive assembly or a particular card cage structure. The various aspects of the present invention also provide methods and mounting configurations suitable for damping vibration generated by a disk drive that would normally be transmitted to a card cage and then to other drives. Furthermore, the various aspects of the present invention provide methods and mounting configurations suitable for damping vibration that would normally be transmitted to a disk drive printed circuit board from a card cage.

With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

What is claimed is:

1. A disk drive mounting configuration comprising:
   a cage including opposing walls defining opposing card slots;
   a card having a front end opposite a back end, the card also including opposite side edge portions extending between the front and back ends, the side edge portions being secured within the opposing card slots of the cage;
   a disk drive mounted on the card;
   at least one clip mounted on each opposite side edge portion of the card, the clips being compressed within the card slots of the cage; and
   elastomeric layers positioned between the clips and the card, wherein the elastomeric layers cooperate with the clips to damp vibration transferred between the card and the cage.

2. The mounting configuration of claim 1, wherein the elastomeric layers are formed by resilient adhesive that secures the clips to the card.

3. The mounting configuration of claim 2, wherein the resilient adhesive is an acrylic adhesive.

4. The mounting configuration of claim 1, wherein the clips are made of a material having elastic characteristics.

5. The mounting configuration of claim 4, wherein the clips are made of beryllium copper.

6. The mounting configuration of claim 1, wherein the clips have generally U-shaped cross-sections and are arranged and configured to straddle the opposite side edge portions of the card.

7. The mounting configuration of claim 1, wherein each clip has first and second spaced-apart legs interconnected by a bridge portion, wherein the clips straddle the opposite side edge portions of the card, and wherein the elastomeric layers are positioned between the first legs and the card, between the second legs and the card, and between the bridge portions and the card.

8. The mounting configuration of claim 1, wherein the back end of the card includes input/output means for providing and electrical connection with a connector located at a back plane of the cage.

9. The mounting configuration of claim 8, wherein the clips are positioned adjacent to the front end of the card.

10. A disk drive assembly comprising:
    a printed circuit board having a front end opposite a back end, the printed circuit board also including opposite side edge portions extending between the front and back ends;
    a disk drive electrically and mechanically connected to the printed circuit board;
    at least one clip mounted on each opposite side edge portion of the printed circuit board; and
    elastomeric layers positioned between the clips and the printed circuit board.

11. The mounting configuration of claim 10, wherein the elastomeric layers are formed by resilient adhesive that secures the clips to the printed circuit board.

12. The mounting configuration of claim 11, wherein the resilient adhesive is an acrylic adhesive.

13. The mounting configuration of claim 10, wherein the clips are made of a material having elastic characteristics.

14. The mounting configuration of claim 13, wherein the clips are made of beryllium copper.

15. The mounting configuration of claim 10, wherein the clips have generally U-shaped cross-sections and are arranged and configured to straddle the opposite side edge portions of the printed circuit board.

16. The mounting configuration of claim 10, wherein each clip has first and second spaced-apart legs interconnected by a bridge portion, wherein the clips straddle the opposite side edge portions of the printed circuit board, and wherein the elastomeric layers are positioned between the first legs and the printed circuit board, between the second legs and the printed circuit board, and between the bridge portions and the printed circuit board.

17. The mounting configuration of claim 10, wherein the back end of the printed circuit board includes an input/output connector.

18. The mounting configuration of claim 17, wherein the clips are positioned adjacent to the front end of the printed circuit board.

19. A method for damping vibration in a disk drive system, the disk drive system including a cage defining opposing card slots, the disk drive system also including a disk drive mounted on a card adapted to be inserted in the card slots of the cage, the method comprising the steps of:
    placing layers of elastomeric non-hardening adhesive on the card adjacent opposite side edge portions of the card;
    securing clips to the opposite side edge portions of the card via the non-hardening adhesive, the non-hardening adhesive being positioned between the clips and the card; and inserting the opposite side edge portions of the card within the card slots of the cage such that the clips and non-hardening adhesive are compressed and deformed within the slots, wherein the clips and non-hardening adhesive cooperate to damp vibration transferred between the card and the cage.

20. The method of claim 19, wherein the non-hardening adhesive is an acrylic adhesive.

21. The method of claim 19, wherein the clips are made of beryllium copper.

22. The method of claim 19, wherein each clip has first and second spaced-apart legs interconnected by a bridge portion, wherein the clips straddle the opposite side edge portions of the card, and wherein the non-hardening adhesive is positioned between the first legs and the card, between the second legs and the card, and between the bridge portions and the card.

* * * * *